(12) United States Patent
Liang

(10) Patent No.: US 8,797,456 B2
(45) Date of Patent: Aug. 5, 2014

(54) NETWORK VIDEO CAMERA HAVING DUAL-JOINT HOLDER STRUCTURE

(76) Inventor: Hui-Hu Liang, Changhua Hsien (TW)

( * ) Notice: Subject to any disclaimer, the term of this patent is extended or adjusted under 35 U.S.C. 154(b) by 1087 days.

(21) Appl. No.: 12/243,572

(22) Filed: Oct. 1, 2008

(65) Prior Publication Data

US 2011/0096222 A1   Apr. 28, 2011

(51) Int. Cl.
*H04N 5/225* (2006.01)
*F16M 11/32* (2006.01)

(52) U.S. Cl.
USPC .......................... 348/376; 248/439; D16/211

(58) Field of Classification Search
None
See application file for complete search history.

(56) References Cited

U.S. PATENT DOCUMENTS

| 6,970,202 | B1* | 11/2005 | Glogan et al. | 348/373 |
| 2007/0001071 | A1* | 1/2007 | Yeh | 248/179.1 |
| 2007/0070205 | A1* | 3/2007 | Huang et al. | 348/207.99 |
| 2009/0095871 | A1* | 4/2009 | Xiao et al. | 248/442.2 |
| 2012/0120236 | A1* | 5/2012 | Xiao | 348/143 |

* cited by examiner

*Primary Examiner* — Justin P Misleh
(74) *Attorney, Agent, or Firm* — Jackson IPG PLLC

(57) ABSTRACT

A network video camera having a dual-joint holder structure includes a lower body cover, a turning base board, a base splint, a base cover, a first turning joint, and a second turning joint. The present invention provides a succinct appearance and a convenient way for adjustment and storage.

5 Claims, 6 Drawing Sheets

NETWORK VIDEO CAMERA HAVING DUAL-JOINT HOLDER STRUCTURE

BACKGROUND OF THE INVENTION

1. Field of the Invention

The present invention relates to a holder structure, and more particularly to a network video camera having a dual-joint holder structure.

2. Description of the Prior Art

There are two types of network video camera, desk-top type and hook type. They are limited when in use. In order to provide an exchangeable function, there are various functional designs on the market for a user to have different choices. A holder is provided to adjust the angle of a lens module. The positioning way uses a bolt to adjust the angle of the holder and then to be positioned. The user has to assemble the holder himself/herself after purchase so as to reduce packing volume and transportation cost.

SUMMARY OF THE INVENTION

The primary object of the present invention is to provide a network video camera having a dual-joint holder structure to overcome the aforesaid shortcomings.

According to the present invention, there is provided a network video camera having a dual-joint holder structure, comprising:

an upper body cover, the upper body cover securing a lens lid, a lens module, and a circuit board to a lower body cover, the network video camera being fixed on the lower body cover, the lower body cover comprising a storing trough at a rear side thereof, a first fixing ear being provided at a lower end of the storing trough;

a turning base board, a lower end of the turning base board comprising a pair of first ears, a reverse U-shaped notch formed between the pair of first ears, and a hooking surface above the reverse U-shaped notch, a pair of first damping rings being provided and inserted into respective sides of the pair of first ears, a second fixing ear being provided on an upper end of the turning base board;

a base splint, the base splint comprising a pair of second ears corresponding in position to respective sides of the second fixing ear, a second notch formed between the pair of second ears, and a pair of second damping rings being provided and inserted into the second ears;

a base cover, the base cover comprising a fixing seat for securing the base splint;

a first turning joint, the first turning joint being formed by that the first fixing ear of the lower body cover is placed into the first reverse U-shaped notch between the first ears; a first bolt is inserted through the first ears, the first reverse U-shaped notch, the first fixing ear, and the first damping rings, and be fastened with a first nut; and a second turning joint, the second turning joint being formed by that the second fixing ear of the turning base board is placed into the second reverse U-shaped notch between the second ears; a second bolt is inserted through the second ears, the second reverse U-shaped notch, the second first fixing ear and the second damping rings, and be fastened with a second nut.

Compared to the prior art, the present invention provides a network video camera having a dual-joint holder structure, which has a succinct appearance after storage and provides convenient way for adjustment and storage.

DETAILED DESCRIPTION OF THE PREFERRED EMBODIMENTS

Embodiments of the present invention will now be described, by way of example only, with reference to the accompanying drawings.

Figure 1:
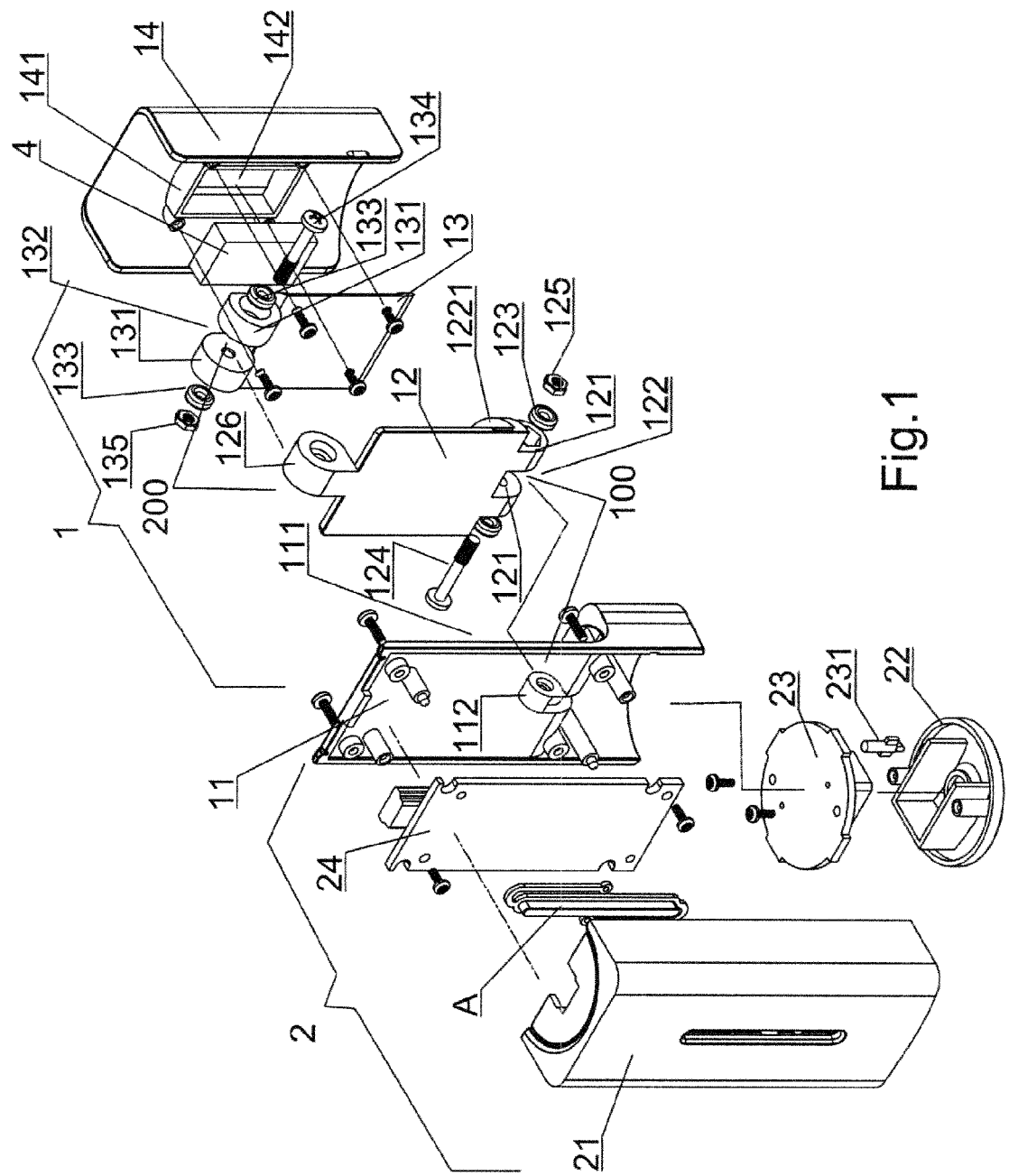
FIG. 1 is an exploded view of a first preferred embodiment of the present invention.
Figure 2:
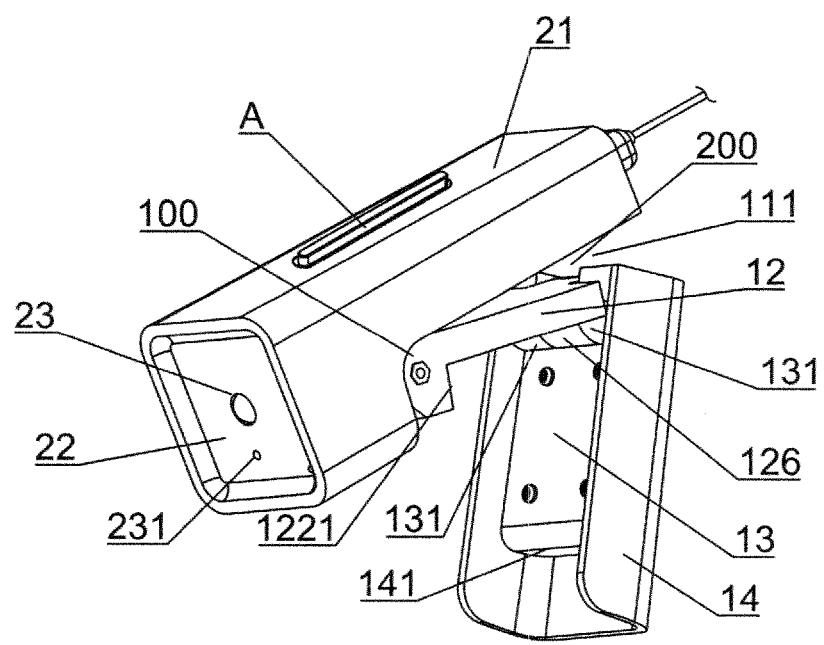
FIG. 2 is a perspective view of the first preferred embodiment of present invention.

As shown in FIGS. 1 and 2, a dual-joint holder 1 according to a first preferred embodiment of the present invention comprises a lower body cover 11, a turning base board 12, a base splint 13, and a base cover 14. The lower body cover 11 comprises a storing trough 111 and a first fixing ear 112 at a lower end thereof. The first fixing ear 112 is inserted into a first reverse U-shaped notches 122 located between a pair of first ears 121 of the turning base board 12. A hooking surface 1221 is provided above the first reverse U-shaped notch 122. Two damping rings 123 are inserted into respective sides of the first ears 121, respectively. A first bolt 124 is inserted through the first reverse U-shaped notch 122 and the first fixing ear 112 and locked by a first nut 125, functioning as a first turning joint 100. By the friction of the first damping rings 123, the first turning joint 100 is able to be positioned and adjusted at a desired angle for a network video camera.

Another end of the turning base board 12 is provided with a second fixing ear 126. The second fixing ear 126 is inserted into a second reverse U-shaped notch 132 between a pair of second fixing ears 131 of the base splint 13. Two damping rings 133 are inserted into respective sides of the second ears 131, respectively. A second bolt 134 is inserted through the second reverse U-shaped notch 132 and the second fixing ear 126 and locked by a second nut 135, functioning as a second turning joint 200. By the friction of the first damping rings 133, the second turning joint 200 is able to positioned and adjusted at a desired angle for a network video camera.

Figure 3:
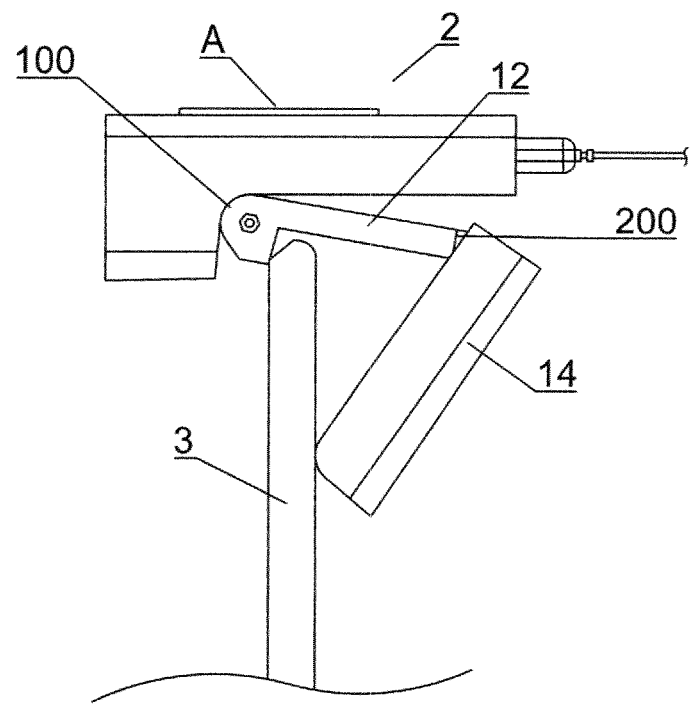
FIG. 3 is a schematic view of the first preferred embodiment of the present invention mounted on a screen.
Figure 4:
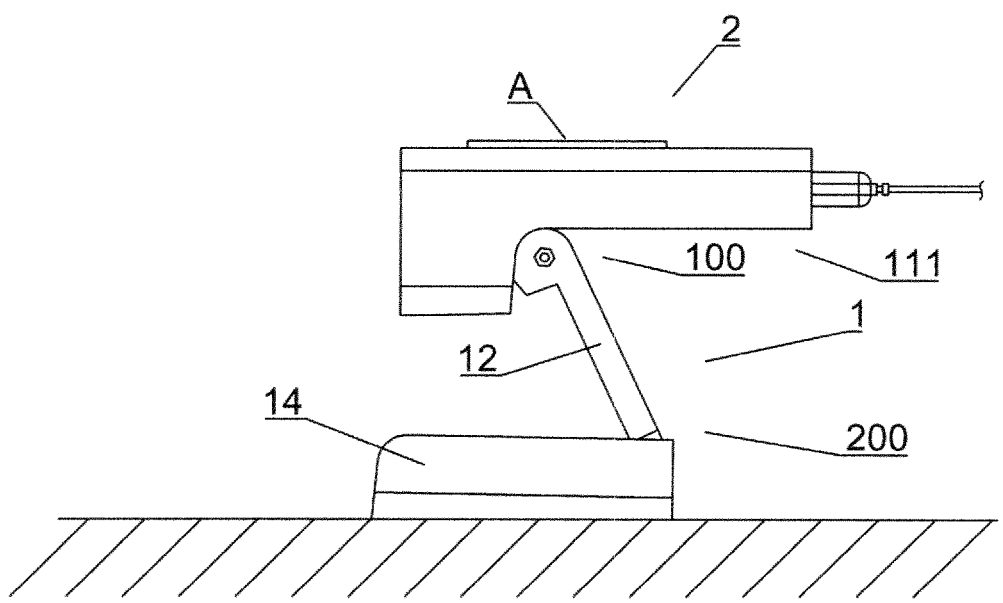
FIG. 4 is a schematic view of the first preferred embodiment of the present invention mounted on a flat surface.
Figure 5:
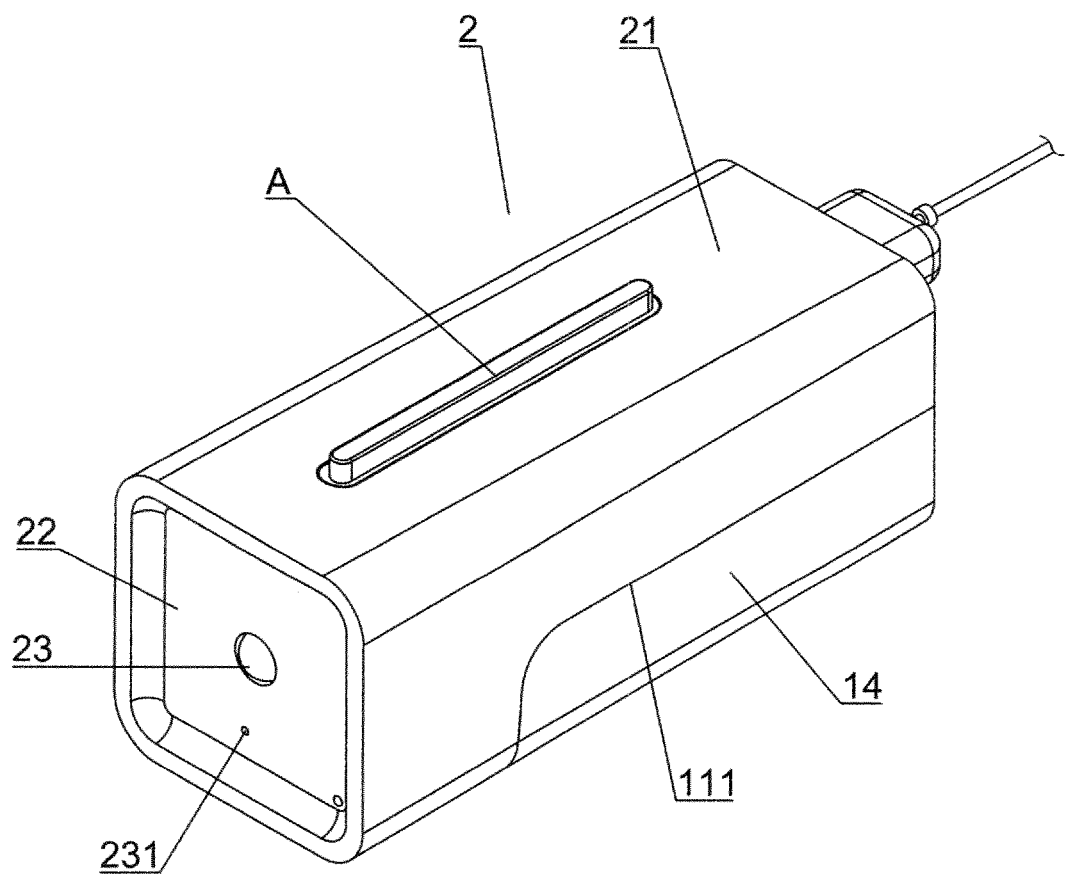
FIG. 5 is a schematic view of the first preferred embodiment of the present invention in a stored status.
Figure 6:
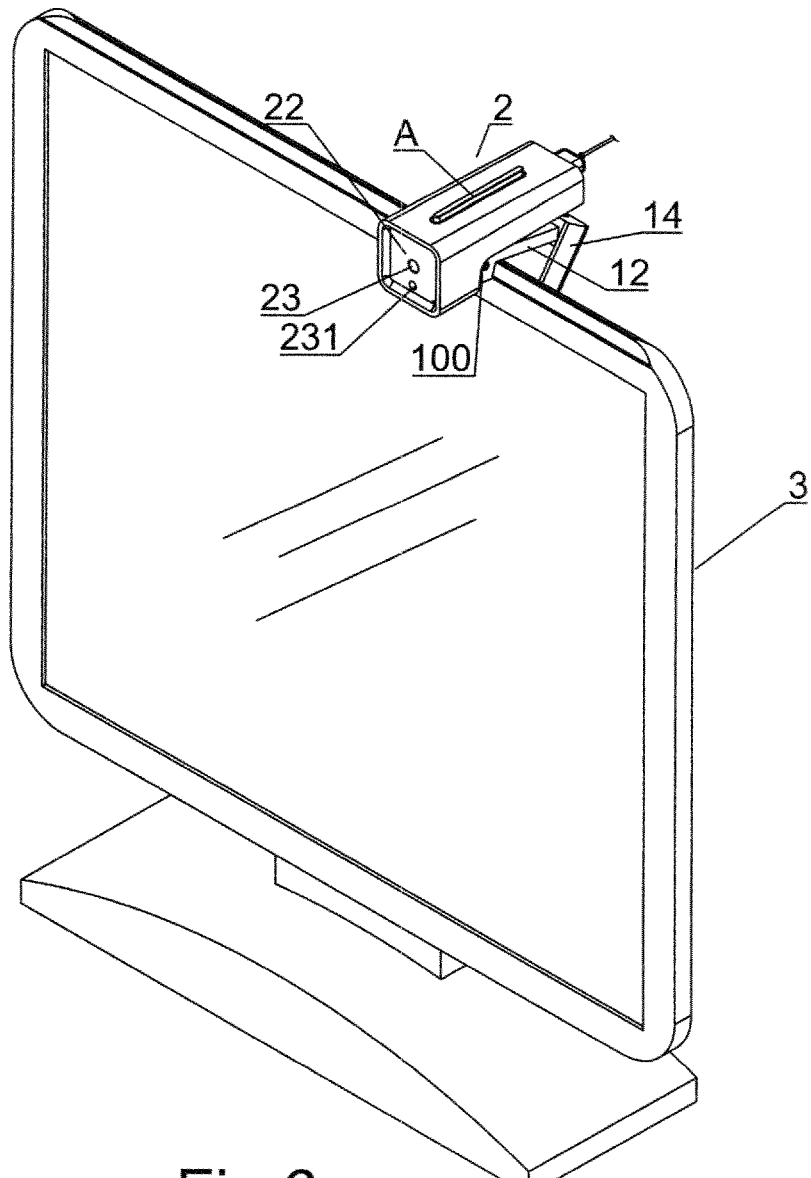
FIG. 6 is a perspective view of the first preferred embodiment of the present invention mounted on the screen.

The base splint 13 is fixed to a fixing seat 141 of the base cover 14. An upper body cover 21 of a network video camera 2 is penetrated with a key A for taking a photograph. A camera lens lid 22 is to secure a lens module 23, a light emitting diode 231 and a circuit board 24 to the lower body cover 11. By the fastening and turning of the first and second damping rings 123 and 133, the first turning joint 100 and the second turning joint 200 are adjusted for a desired angle of the lens module 23 of the network video camera 2, providing a changeable adjustment for the lens module 23. The present invention may be mounted on a screen 3 (as shown in FIGS. 3 and 6), or on a flat surface 14 (as shown in FIG. 4). The base cover 14 is able to be stored in the storing trough 111 of the lower body cover 11 via the first turning joint 100 and the second turning joint 200, as shown in FIG. 5. This provides a succinct appearance and a convenient way for adjustment and storage.

As shown in FIGS. 1 through 6, when the present invention is mounted on the screen 3, the turning base board 12 and the base cover 14 will be pulled open through the second turning joint 200, the hooking surface 1221 will engage with the front edge of the screen 3, and the base cover 14 will hold against the back of the screen 3. The first turning joint 100 is used to adjust the upward/downward angle of the network video camera 2.

As shown in FIGS. 1, 3 and 5, the base cover 14 may comprises an accommodating trough 142 to accommodate a balance weight 4 therein. The base splint 13 is adapted to cover the accommodating trough 142 and confine the balance weight 4 within the accommodating trough 142, providing an appropriate weight to the base cover 14 so as to balance the weight of the network video camera 2.

As shown in FIG. 1 through 7, the lens module 23 is provided with the light emitting diode 231 at an appropriate position, and the light emitting diode 231 is exposed outside the lens lid 22 to provide a motion status of the network video camera 2.

Figure 7:
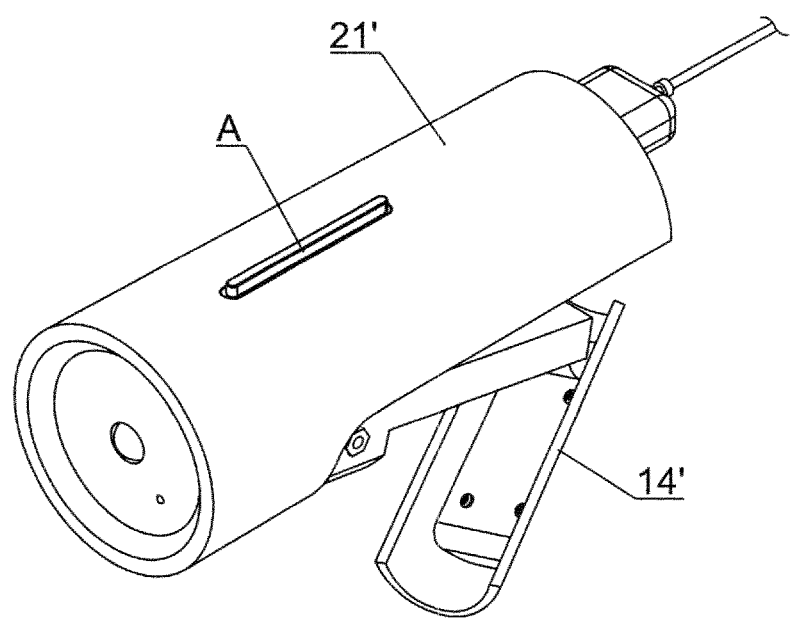
FIG. 7 is a perspective view of a second preferred embodiment of present invention.

As shown in FIG. 7, a second preferred embodiment of the present invention is substantially similar to the aforesaid first preferred embodiment, with the exceptions described hereinafter. The upper body cover 21' of the network video camera 2' and the base cover 14' are made in the shape of a cylinder or other 3D geometry shapes.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A network video camera having a dual-joint holder structure, the dual-joint holder structure being able to support the network video camera, to adjust an angle of the network video camera and to position the network video camera, comprising:
   an upper body cover, the upper body cover securing a lens lid, a lens module, and a circuit board to a lower body cover, the network video camera being fixed on the lower body cover, the lower body cover comprising a storing trough at a rear side thereof, a first fixing ear being provided at a lower end of the storing trough;
   a turning base board, a lower end of the turning base board comprising a pair of first ears, a reverse U-shaped notch formed between the pair of first ears, and a hooking surface above the reverse U-shaped notch, a pair of first damping rings being provided and inserted into respective sides of the pair of first ears, a second fixing ear being provided on an upper end of the turning base board;
   a base splint, the base splint comprising a pair of second ears corresponding in position to respective sides of the second fixing ear, a second notch formed between the pair of second ears, and a pair of second damping rings being provided and inserted into the second ears;
   a base cover, the base cover comprising a fixing seat for securing the base splint;
   a first turning joint, the first turning joint being formed by that the first fixing ear of the lower body cover is placed into the first reverse U-shaped notch between the first ears; a first bolt is inserted through the first ears, the first reverse U-shaped notch, the first fixing ear, and the first damping rings, and be fastened with a first nut; and
   a second turning joint, the second turning joint being formed by that the second fixing ear of the turning base board is placed into the second notch between the second ears; a second bolt is inserted through the second ears, the second notch, the second first fixing ear and the second damping rings, and be fastened with a second nut.

2. The network video camera having a dual-joint holder structure, as claimed in claim 1, wherein the base cover comprises an accommodating trough to accommodate a balance weight therein, the base splint covering the accommodating trough to confine the balance weight within the accommodating trough.

3. The network video camera having a dual-joint holder structure, as claimed in claim 2, wherein the upper body cover is provided with a key for taking a photograph.

4. The network video camera having a dual-joint holder structure, as claimed in claim 2, wherein the upper body cover is to couple the lens lid, the lens module and the circuit board with the lower body cover, with the first turning joint to adjust upward/downward angle.

5. The network video camera having a dual-joint holder structure, as claimed in claim 4, wherein the lens module is provided with a light emitting diode to show the motion status of the network video camera.

* * * * *